US007565426B2

(12) United States Patent
Jones et al.

(10) Patent No.: US 7,565,426 B2
(45) Date of Patent: Jul. 21, 2009

(54) MECHANISM FOR TRACING BACK ANONYMOUS NETWORK FLOWS IN AUTONOMOUS SYSTEMS

(75) Inventors: Emanuele Jones, Ottawa (CA); Jean-Marc Robert, Ottawa (CA)

(73) Assignee: Alcatel Lucent, Paris (FR)

( * ) Notice: Subject to any disclaimer, the term of this patent is extended or adjusted under 35 U.S.C. 154(b) by 1051 days.

(21) Appl. No.: 10/635,602

(22) Filed: Aug. 7, 2003

(65) Prior Publication Data

US 2005/0044208 A1 Feb. 24, 2005

(51) Int. Cl.
*G06F 15/173* (2006.01)
*G06F 11/00* (2006.01)
(52) U.S. Cl. .................. 709/224; 709/225; 726/22; 370/229
(58) Field of Classification Search ................ None
See application file for complete search history.

(56) References Cited

U.S. PATENT DOCUMENTS

| 7,215,637 B1* | 5/2007 | Ferguson et al. ......... 370/230.1 |
| 2003/0035370 A1* | 2/2003 | Brustoloni ................ 370/229 |
| 2003/0172289 A1* | 9/2003 | Soppera ................... 713/200 |
| 2004/0054924 A1* | 3/2004 | Chuah et al. ............. 713/201 |
| 2004/0093521 A1* | 5/2004 | Hamadeh et al. .......... 713/201 |
| 2006/0212572 A1* | 9/2006 | Afek et al. ............... 709/225 |

* cited by examiner

Primary Examiner—Wen-Tai Lin

(57) ABSTRACT

A system and method of tracing network flows in an autonomous communications system are described. The Autonomous System may be formed of multiple subgroups depending on size and application. Each subgroup contains multiple, interconnected routers which participate in transporting data flow across the Autonomous System (AS). A Director within the AS has a full and complete vision of the network topology. When it is desired to trace a particular flow because of an identified attack, selected routers in key locations—through which that particular flow travels—mark packets with labels which enable the tracing of the path. These labels permit the source of the attack, at least in so far as it travels through the AS, to be identified. If the number of entry (or key) points to the AS is larger than the number of available labels, the AS will be divided into subgroups, the flow is traced from subgroup to subgroup.

22 Claims, 1 Drawing Sheet

MECHANISM FOR TRACING BACK ANONYMOUS NETWORK FLOWS IN AUTONOMOUS SYSTEMS

FIELD OF THE INVENTION

This invention relates to wide area communications systems and more particularly to an apparatus and method for tracing network flows in such communications systems.

BACKGROUND

Global-based communications networks such as the Internet have evolved from an early, research-based system with limited access, to a truly world wide network with millions of users. The original network protocol, TCP/IP, was designed on the basis that system users would connect to the network for strictly legitimate purposes. As a consequence, no particular consideration was given to security issues. In recent years, however, the incidence of malicious attacks on the Internet has grown to an alarming proportion. These attacks, which take on a variety of forms, often lead to a complete disruption of service for a targeted victim.

One such attack is based on the concept of flooding a victim with so much traffic that the victim's server cannot cope, or with very effective malicious packets at lower rates. Due to its anonymous nature, the Internet Protocol (IP) makes it extremely difficult to precisely identify the real source of any given datagram, and thus any given flow, if the source wishes to remain unknown. This peculiarity is often exploited, during a malicious Denial of Service (DoS) attack, to hide the source of the attack. A DoS attack involves blocking somebody's ability to use a given service on the network. DoS attacks are common across the Internet with many being launched daily at various targets.

Thus, if an attacker uses a spoofed source address—i.e. replaces its legitimate address with an different/illegitimate one—it is very difficult to trace the real source of the attack. It is expected that if attackers were open to identification the incidence of DoS attacks would decrease significantly.

Several methods have been proposed for solving the IP trace back problem. A thorough overview on the topic is given by H. F. Lipson in a special report entitled "Tracking and Tracing Cyber-Attacks: Technical Challenges and Global Policy Issues", CERT Coordination Center. Among all the other techniques that this paper describes, a hop-by-hop trace back scheme is discussed. This mechanism consists of a manual and tedious process by which an administrator gathers information on each router on the upstream path of the flow being traced one step at a time until the source is reached.

Other prior art solutions involve systems where routers are requested to insert their IP addresses, or other unique identifiers, into IP packet headers with a certain probability. This method relies on the victim of an attack reconstructing the path by using the information gathered by correlating all the received, marked datagrams. This system is described by S. Savage, D. Wetherall, A. Karling and T. Anderson in "Practical Network Support for IP Trace back", SIGOMM'00, Stockholm, Sweden.

The iTrace method relies on routers sending a new type of Internet control message protocol (ICMP) message to the destination of the datagram examined with a certain probability. By gathering a given number of these messages the receiver of a certain flow can reconstruct the path to the source. This method is described by S. Bellovin, M. Leech, T. Taylor, "ICMP Trace back messages", IETF work in progress.

In a hash-based solution every router keeps a table containing a hashed value from every packet forwarded during a given interval. If a particular flow is to be traced, routers on the upstream path forward their tables to an entity that will carry out a correlation process to determine the next hop. The method relies on Bloom filters to speed up the look-up process in the table. This method is described by C. Snoeren, C. Patridge, L. Sanchez et al., "Hash-based IP Trace back", SIGCOMM'01, San Diego.

End-to-end IP trace back across multiple Autonomous Systems (AS) is still an unsolved problem although some work is being done by the IETF in an attempt to define a common framework to achieve this goal.

The present invention focuses on one of the many issues IP trace back frameworks are faced with: how to trace a flow from one end to another of a single AS given the signature and the egress point of the flow.

All the other methods described above could potentially be employed to solve the same problem, but they all generally carry too much overhead. Since all these methods were primarily designed to work across multiple Autonomous Systems, they are computationally intensive and/or require an extensive usage of network resources if compared to the proposed solution. For example: both the hash-based and iTrace methods need Public Key Infrastructures; or all methods need to have the "marking mechanisms" always turned on; or all methods are demanding in terms of memory: either for storing a hashed value of every forwarded packet or for storing marking values from millions of packets as it will be exemplified later.

Finally all the mentioned prior art methods have trouble—or are not effective at all—in the case of Distributed Denial of Service (DDoS) attacks. In a DDoS attack several sources are involved directly or indirectly to carry out an attack on a victim. The only realistic solution is the Hop-by-Hop IP trace back method which is not a clearly defined technique but rather a lengthy procedure based on the available equipment and the experience of the administrator.

There is, therefore, a need for methods and systems for identifying a source of a packet flow in a communication system.

SUMMARY OF THE INVENTION

The present invention provides methods and apparatus for determining sources of data packet flows in a plurality of network nodes forming an Autonomous System and connected to network devices that are external to the Autonomous System in a communication network.

Therefore, in accordance with a first aspect of the present invention there is provided a method of determining a source of data packet flow into a plurality of network nodes forming an Autonomous System and connected to network devices that are external to the Autonomous System in a communication network comprising the steps of: a) detecting, by one of the plurality of network nodes and according to a signature, packets of a particular flow for which a source is to be determined; b) marking, by said network devices, packets received by network nodes from said network devices, the marking including a label indicating the network node and an associated interface; c) identifying, by the detecting network node, marking network nodes that are marking packets of the particular flow; and d) for each identified marking network node recording its label as a source of the particular flow.

In accordance with a further aspect of the invention there is provided a system for determining sources of data packet flow into a plurality of network nodes forming an Autonomous System and connected to network devices that are external to the Autonomous System in a communication network comprising: means at one of said plurality of network nodes to detect according to a signature packets of a particular flow for which a source is to be determined; means at the network devices to mark packets received by network nodes from the network devices, the marking including a label indicating the network node and associated interface; means at the detecting network node to identify marking network nodes that are marking packets of that particular flow; and means for each identifying marking network node to record its label as a source of the particular flow.

BRIEF DESCRIPTION OF THE DRAWINGS

The invention will now be described in greater detail having reference to the attached figure which shows a high level view of an Autonomous System including subgroups and system components.

DETAILED DESCRIPTION OF THE INVENTION

Figure 1:
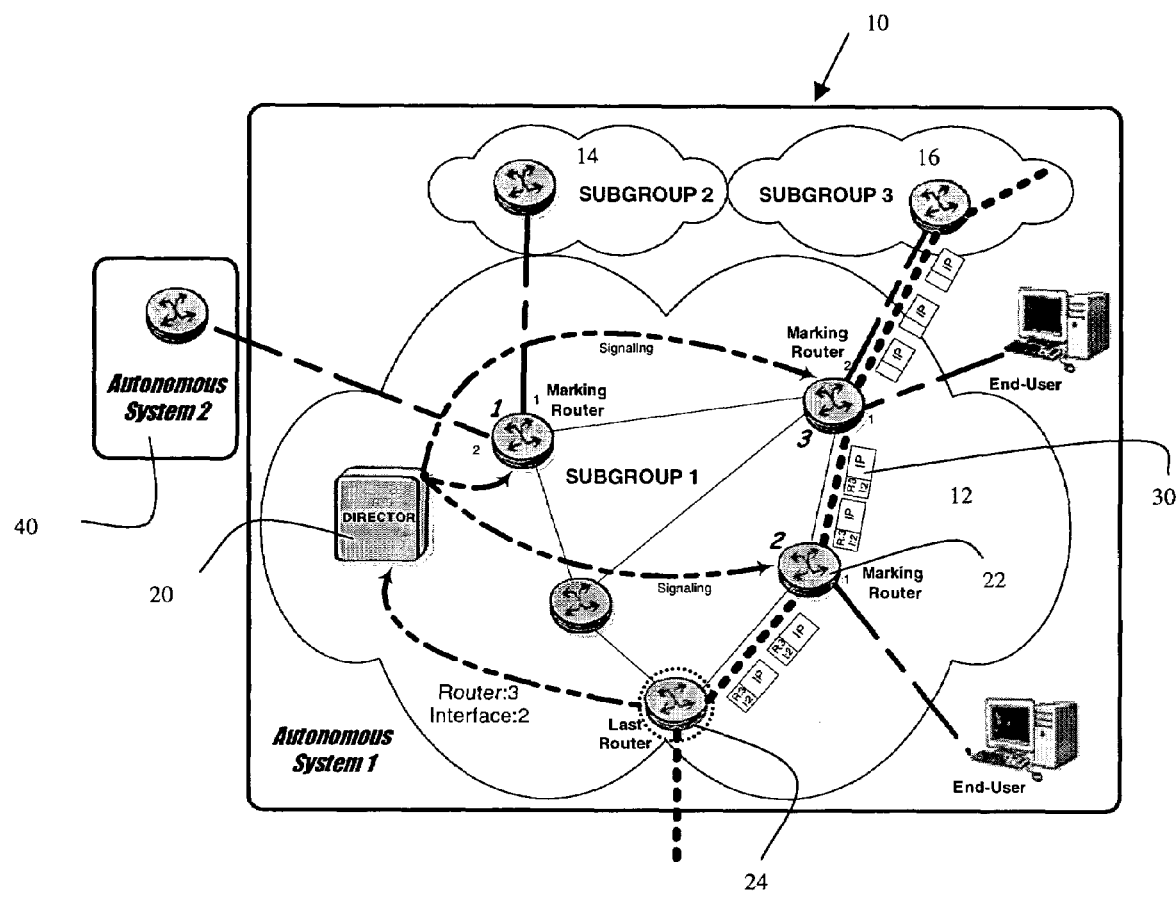

As shown in FIG. 1 the invention applies to an Autonomous System shown generally at 10. Within the Autonomous System there may be one or more subgroups shown generally as subgroup 12 subgroup 14 subgroup 16. As shown in FIG. 1 subgroup 12 has multiple routers while subgroups 14 and 16 only show a single router. It is to be understood, of course, that subgroups 14 and 16 are likely to have multiple routers as well.

Within subgroup 12 there is shown a new element known as a Director 20—an entity detached from any subgroup—which has a full and complete vision of the AS networks topology. In the case of an Autonomous System running a Link State routing protocol like OSPF (Open Shortest Path First), every router participating in the routing session has this vision for its Area. The Director 20 is able to exchange information with any router in the Autonomous System.

The Autonomous System as shown comprises a network of routers 22 connected together to carry traffic from an ingress point to an egress point. The system may be logically partitioned into a given number of subgroups as shown. If the system is small enough the subdivision might not be necessary at all. In the case of OSPF this logical subdivision could conveniently follow the routing Areas partitioning.

According to the invention certain routers within the subsystem are assigned identifiers in order to enable the Director 20 to track flows across the Autonomous System. These identifiers are known as Router Labels and External Interface Labels. The Router Labels are unique within any given subgroup and are used to identify the router within the subgroup. The External Interface Label is assigned only to interfaces connecting to external nodes as will be defined later. The Last Router 24 is the last node belonging to the Autonomous System on the path to the destination of the flow being tracked or indeed the victim of a malicious flow. Information about which node is the Last Router for a given flow could be provided by an IP trace back framework if the destination or victim does not belong to the examined AS or it could be provided by some detection mechanism installed on, or near, the victim itself. The Last Router sees all the traffic to the victim crossing the AS and it is capable of matching malicious packets by their signature. It is also capable of communicating to the Director 20 information concerning the marking contained by the packets that are matching this signature. This information includes the router and interface labels.

The current set up of the subgroup division needs to be communicated to each router that is taking part in the tracking process. This does not necessarily mean that every router in a given subgroup is always participating in the tracking process when its subgroup is activated by the Director 20.

In a dynamic way, the Director 20 could pass both labeling information—i.e. the Router Labels and the External Interface Labels—to each node every time it needs the node to be active. In this way, the Director 20 could potentially assign a different label to the same node every times it wishes the node to perform the marking task.

In a static way, the Director 20 can pre-assign labels to all its nodes and pre-load potentially tracking nodes with information about their marking interfaces.

Hybrid solutions could also be used. Another possible implementation is to have a router in every subgroup (e.g. in OSPF it could be the ABR, Area Border Router) in charge of keeping synchronization with the Director and to tell the other routers which of their interfaces are connected to routers within the same subgroup and which are not.

Every router can be asked to start marking. This operation consists of inserting into an IP packet the Router Label and External Interface Label, which is identifying the incoming interface for the packet, or a single label that comprises both. There are several ways to go about this depending on: the size of the AS, the size of each subgroup and the average number of External Interfaces per router. Three suggested methods are:

If both labels (Router and External Interface) combined can be addressed at most using 16 bits, then there is a choice to either reuse the IP Fragmentation field, or to use the IP Options field.

Any other field in the IP Header, by changing or not its semantic

If the encoding mechanism needs more than 16 bits, the IP Options field should be used.

It is important to note that the proposed solution—unlike most current IP trace back solutions—does not need to always mark every packet on every router of the AS. The present invention only requires a certain subgroup of routers to mark a subset of the forwarded packets for a very short period of time, all in the effort to minimize IP traffic disruption. This means that QoS guarantees, and other Service Level Agreements (SLA) issues, are likely to not be impacted much, if at all, by the method described here.

Thus, it is even possible to suggest the usage of one, or more, IP Options fields for carrying the marking information, forcing packet length to be expanded by a few bits, at most 32 bits, for the router address, plus a number of bits equal to the logarithm of the number of External Interfaces per router.

Further mechanisms could be put in place to allow border routers connecting to other Autonomous Systems to remove intra-AS markings from IP packets, especially if this is implemented as IP Options, before routing traffic out of the AS.

As an example, the label "3.7" will mean Router 3 and Interface 7 within the subgroup being examined. The manner in which these labels are incorporated in the flow is shown by the packets 30 in the Figure. The labels R:3, I:2 indicate that the flow entered the subgroup on Interface 2 of Router 3.

Given an already existing topology, the administrator will be faced with the choices of the minimum number of bits to use and where to mark these bits in the IP packets. The possible tradeoffs are:

Several small subgroups versus a few big subgroups while keeping the number of encoding bits constant.

Number of encoding bits versus convergence speed. Increasing the number of encoding bits increases the number of routers that can be inspected together.

With the previous requirements in place the algorithm to trace a network flow proceeds as follows:

1) An external entity (e.g. a customer premises equipment such as a Firewall or an Intrusion Detection System (IDS) or the Director of an adjacent AS) or the Last Router itself—if capable—signals to the Director to start the tracking process.
2) The subgroup containing the Last Router is the first one to be inspected.
3) The Director signals all Marking Routers within the current subgroup to start marking. A router is a Marking Router if and only if it has an interface connected to a network equipment belonging to:
   a. a different subgroup, or
   b. a different AS, or
   c. end-user premises.
Network equipments belonging to any of the above mentioned groups are referred to as External Routers.
4) Until notified to stop by the Director, every Marking Router will insert its Router Label and its External Interface Label on every IP packet incoming from any External Node. Marking Routers will also remove all pre-existing markings on IP packets incoming from External Nodes.
5) The Last Router can isolate malicious packets by checking its traffic against a rule (signature) provided by its own detection capabilities, by a downstream victim node or by the Director. The Last Router will communicate to the Director which routers are currently marking the attacking packets, these are called Active Routers.
6) If there is more than one Active Router, the flow is composed of multiple sources that are converging to the same victim. Each flow can be seen as a branch of a tree.
A branch has been completely visited when the first router introducing the flow into the subgroup has been located. Because a single flow can enter a given subgroup multiple times, a branch is considered fully inspected only when there is no more Active Router for that branch after the marking mechanism has been disabled on every Marking Router belonging to that branch.
7) The Director repeats the following steps until there are no more Active Routers
   a. Pick an Active Router
   b. If the Active Router is pointing to a different AS 40
      i. The information is sent back to the IP trace back framework. This finishes the processing of this branch.
   c. If the Active Router is connected to an end-user premises
      i. The source of this branch has been identified. This finishes the processing of this branch.
   d. Otherwise, the Director deactivates the marking process from the Active Router. Then, the Last Router reports back either that
      i. the Active Router has been replaced by one or more (in case of forking) new Active Routers, belonging to the same subgroup, or
      ii. the Active Router was the last one in that subgroup for that branch. In this case, the adjacent subgroup has to be identified by the Director for later processing.

After all branches have been inspected, the Director signals all the remaining Marking Routers in the current subgroup to stop marking. Then, the process is applied recursively to all subgroups localized through the various steps of the tracing process.

The invention proposed here has several advantages over the prior art solutions.

The Hop-by-Hop IP Trace back method lacks any optimization, requires close human intervention and forces routers to be set in some sort of debugging, diagnostic or logging mode in order to identify the incoming interface of an IP packet. Hop-by-Hop IP Trace back fails if any router along the upstream path lacks sufficient diagnostic capabilities or resources.

The present method can be fully automated and does not require routers to be configured in any special diagnostic mode. Moreover, this method is expected to localize the flow's source, for the AS, in two or three steps on average, and in the same number of steps as the Hop-by-Hop solution in the worst case. For example on an average size OSPF topology, while the Hop-by-Hop method might need 10-15 steps to trace a flow from the entry node in the backbone to the last edge router on an area, this solution will only need to inspect the backbone at the first step to localize the specific area and the area during the second step to localize the specific source.

In the case of iTrace there are a number of issues to be considered. First, it is extremely easy for an attacker to forge malicious ICMP packets aimed at confusing the real tracing process. Even if a Public Key Infrastructure (PKI) is deployed to overcome forged ICMP messages, then a victim will have to verify the signature of all the ICMP messages received—potentially including malicious ones—while under attack. Moreover, all routers in the AS will have to undergo the cost of signing, with a public key, ICMP messages with probability p.

This invention does not require a PKI; the nature of the invention itself prevents spoofed markings—possibly introduced by an attacker on its own attacking flow—to disable the trace back process since any of these markings will be removed by the Marking Routers. Moreover the marking process is only turned on for a very brief period of time in order to minimize any potential disruption.

In the case of probabilistic marking the major drawback is the computational effort required by the victim, under attack, to reconstruct the flow's path based on the marked packets (e.g. to trace a flow for 15 hops given a probability of 0.51, a victim needs to collect 42,000 packets on average, to guarantee 95% certainty requires more than 294,000 packets). Moreover, the method does not clearly indicate a source node, generally the mechanism will localize 2-5 nodes as equally probable sources of the flow. Further, the probability of marking, needs to be decided and fixed prior to any attack detection. Once this has been done, an attacker can effectively defeat the mechanism by adjusting its distance from the victim based on the value of the probability chosen and starting to insert malicious markings into the traffic. Finally the method is entirely infeasible for tracking attacks that employ only a small number of packets and it also exposes the IP address of core routers (BGP speakers) to end users.

The major advantage of the present solution compared to the probabilistic technique is the light computational overhead on the analyzing entity, the precision in localizing the source within the AS and the robustness of the mechanism to malicious markings by the attacker.

In the case of Hash-Based marking the major drawback is the amount of resources needed on every router in the AS. These resources include the capabilities for hashing EVERY datagram forwarded combined with a fast memory to store these hashes (e.g. 75 GB per minute of memory faster than SDRAM for a single OC-192 interface. On top of that there is the need for the bandwidth to effectively transfer entire tables to the analyzing entity together with a trust mechanism needed to avoid potential DoS attacks against the tracking infrastructure itself. Finally all the entities participating in the trace back must also be precisely synchronized with each others.

When comparing the present invention to this method it is easy to note that there is no need for any of these resources, except maybe the memory to buffer a few packets (e.g. 5-10) on the Last Router depending on the implementation chosen.

Although particular embodiments of the invention have been described and illustrated it will be apparent to one skilled in the art that numerous changes can be made without departing from the basic concept. It is to be understood that such changes will fall within the full scope of the invention as defined by the appended claims.

We claim:

1. A method of determining a source of data packet flow into a plurality of network nodes forming an Autonomous System and connected to network devices that are external to the Autonomous System in a communication network, said Autonomous System including a Director that signals network nodes in said Autonomous System to initiate marking of packets, said method comprising:
    detecting, by a detecting entity and according to a signature, packets of a particular flow for which the source is to be determined, said detecting entity signaling said Director to start a tracing process;
    said Director requesting some of said network nodes to mark a subset of packets received by network nodes from said network devices through incoming interfaces during a period of time when marking network nodes are being identified and discontinue marking packets by said network nodes when there are no more marking network nodes to be identified, the marking including a router label that identifies a particular network node for each packet and an external interface label that identifies a particular incoming interface for each packet;
    identifying, by a detecting network node, ones of said network nodes that are marking packets of the particular flow; and
    for each identified network node that is marking packets of the particular flow, recording said router label and said external interface label as a source of the particular flow.

2. The method as defined in claim 1, further comprising:
    dividing the Autonomous System into multiple subgroups; and
    determining sources across the multiple subgroups.

3. The method as defined in claim 2, further comprising:
    considering each subgroup is considered separately; and
    removing sources which are links between subgroups for further consideration.

4. The method as defined in claim 1, further comprising:
    assigning dynamically the identification of said network node by said router label.

5. The method as defined in claim 1, further comprising:
    assigning dynamically the identification of said incoming interfaces, on said network nodes, by said external interface label.

6. The method as defined in claim 1, further comprising:
    marking the packets using any IP field, including IP Options.

7. The method as defined in claim 1, wherein the detecting entity, which signals said Director to begin said tracing process, is said detecting network node.

8. The method as defined in claim 1, wherein the detecting entity is a Last Router in the Autonomous System, the Last Router being located in the Autonomous System immediately before a victim of an attack.

9. The method as defined in claim 1, wherein the detecting entity is a victim node in the Autonomous System, or directly connected to the Autonomous System.

10. The method as defined in claim 1, further comprising:
    removing all pre-existing markings on IP packets coming from external nodes with said network nodes requested to mark packets.

11. The method as defined in claim 1, further comprising:
    removing all pre-existing markings on IP packets coming from external nodes with said network nodes.

12. The method as defined in claim 1,
    wherein said some of said network nodes are nodes having an interface connected to network equipment belonging to one of the following:
    a. a different subgroup;
    b. a different Autonomous System; and
    c. end-user premises.

13. A system for determining sources of data packet flow into a plurality of network nodes forming an Autonomous System and connected to network devices that are external to the Autonomous System in a communication network comprising:
    means, at some of the network nodes, to mark a subset of packets received by said network nodes from one or more of said network devices through incoming interfaces during a period of time when marking network nodes are being identified and discontinue marking packets by said network nodes when there are no more marking network nodes to be identified, the marking including a router label that identifies a particular network node for each packet and an external interface label that identifies a particular incoming interface for each packet;
    means, at a detecting network node, to identify ones of said network nodes that are marking packets of that particular flow;
    means for each identified marking network node to record said router label and said external interface label as a source of the particular flow; and
    a Director in the Autonomous System for receiving a signal to proceed from a detecting entity that has discriminated, according to a signature, packets of a particular flow for which the source is to be determined, said Director initiating flow tracing in response to said signal to proceed by signaling said some of the network nodes to carry out said marking of packets.

14. The system as defined in claim 13, further including:
    means to coordinate all necessary entities and to communicate across different Autonomous Systems.

15. The system as defined in claim 13,
    wherein the Autonomous System is divided into multiple subgroups and source determination is conducted across the multiple subgroups, from one to another.

16. The system as defined in claim 13,
    wherein the signal is generated by said detecting network node, wherein said detecting network node is a Last Router in the Autonomous System, the Last Router being located in the AS immediately before a victim of an attack.

17. The system as defined in claim 13,
    wherein the signal is generated by a victim node in the Autonomous System, or directly connected to the Autonomous System.

18. The system as defined in claim 13,
wherein the signal is generated by a trusted entity from another domain including the Director of an adjacent Autonomous System.

19. The system as defined in claim 13,
wherein the Director passes the labels to the network devices dynamically.

20. The system as defined in claim 13, wherein the Director pre-assigns labels to network devices.

21. The system as defined in claim 13, wherein the Director employs a combination of dynamic and static label assignment.

22. The system as defined in claim 13,
wherein said some of said network nodes are nodes having an interface connected to network equipment belonging to one of the following:

a. a different subgroup;

b. a different Autonomous System; and c. end-user premises.

* * * * *